Jan. 11, 1966   J. W. G. WALTERS   3,228,321
PARCEL TYING MACHINE
Filed Feb. 13, 1964                    14 Sheets-Sheet 1

Inventor:
John Walter Gray Walters
BY Baldwin & Wight
Attorneys

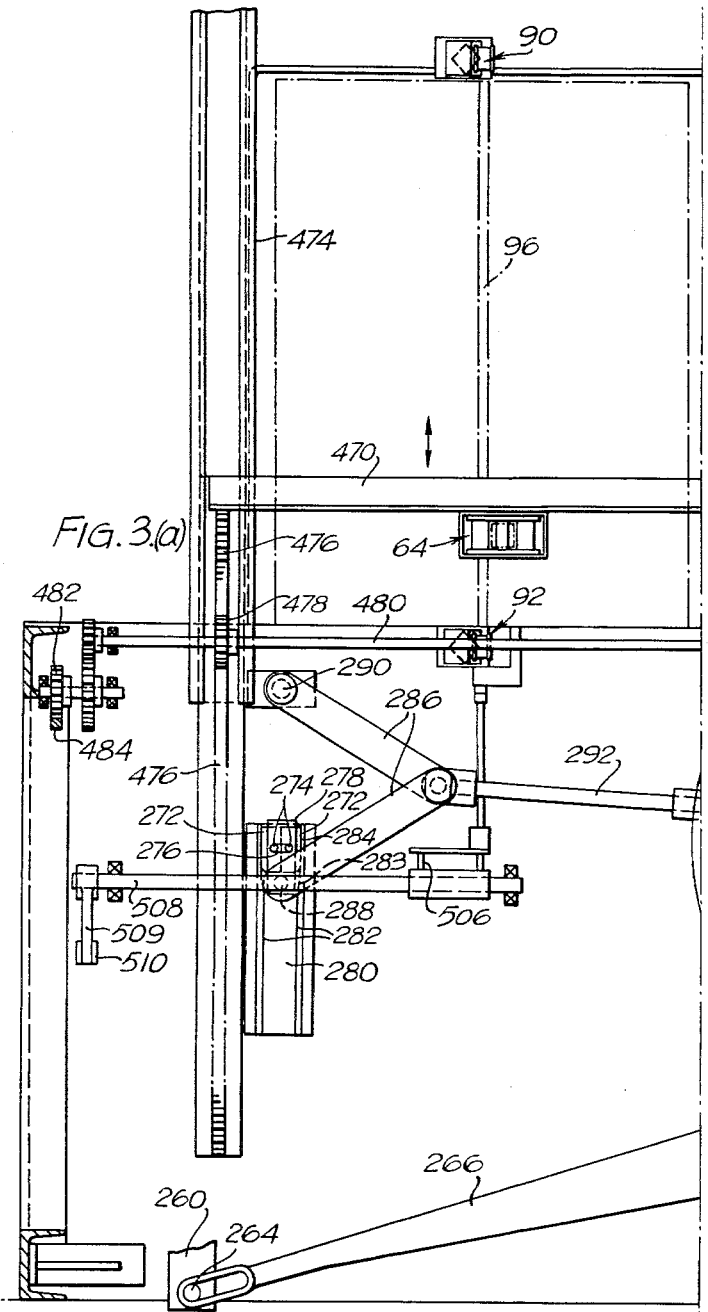

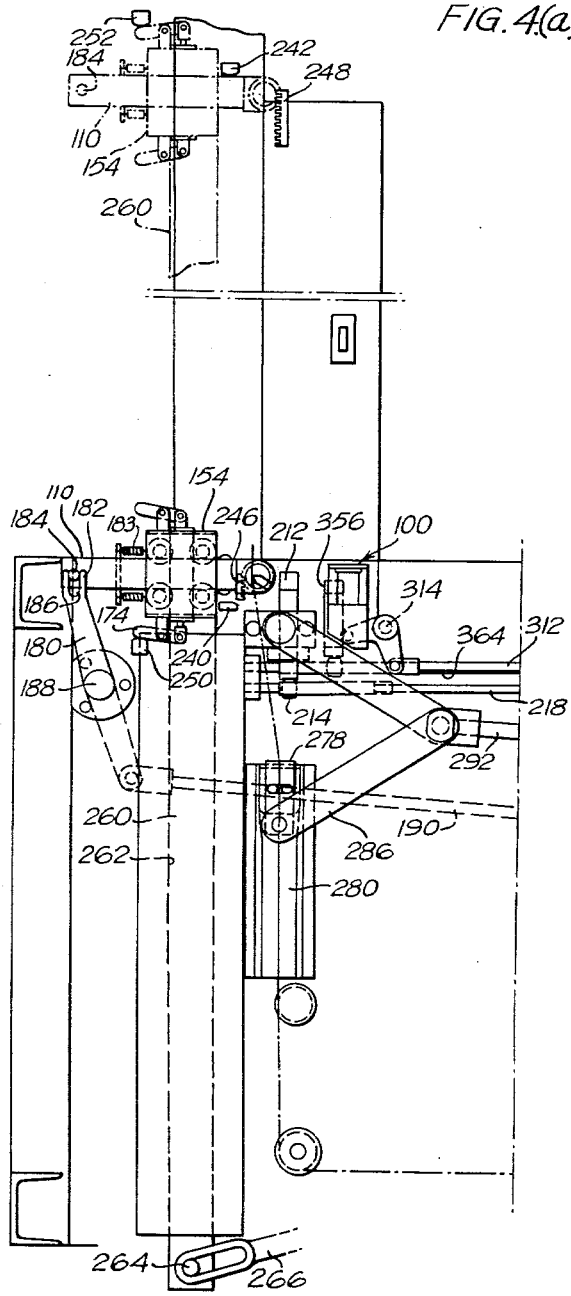

Jan. 11, 1966   J. W. G. WALTERS   3,228,321
PARCEL TYING MACHINE
Filed Feb. 13, 1964   14 Sheets-Sheet 6

Inventor:
John Walter Gray Walters
BY Baldwin & Wight
Attorneys

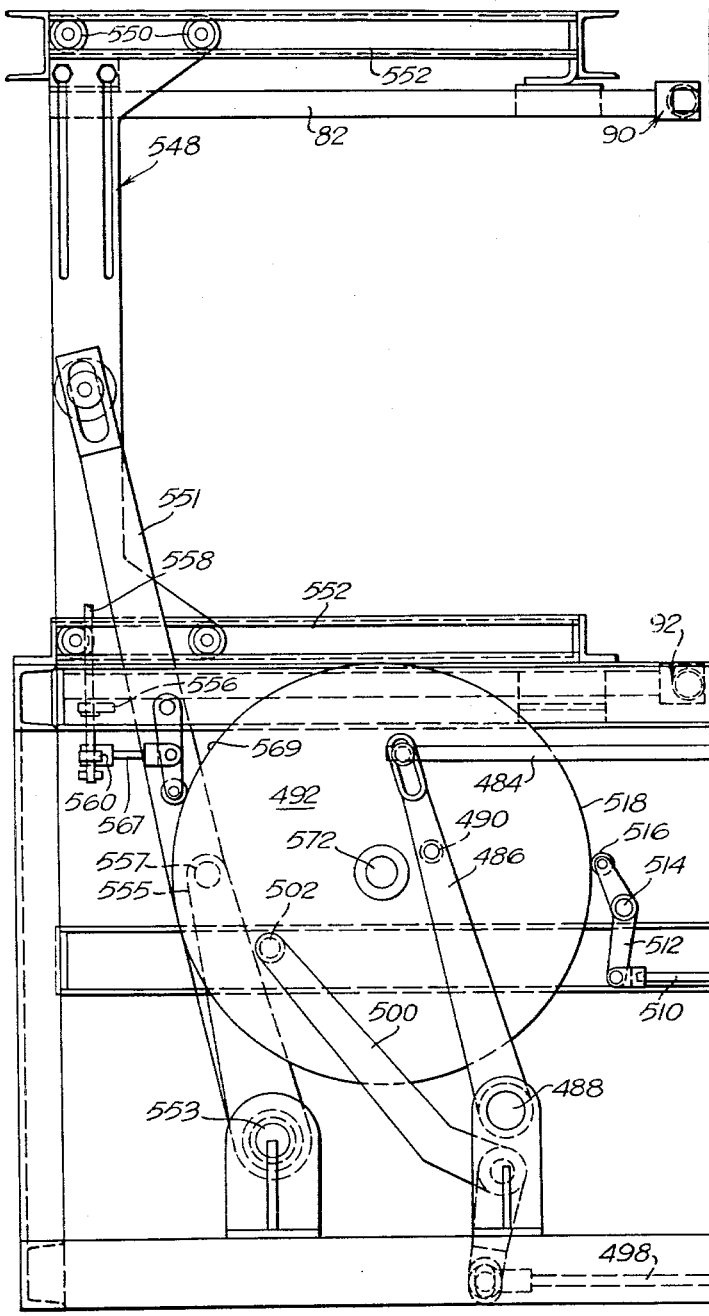

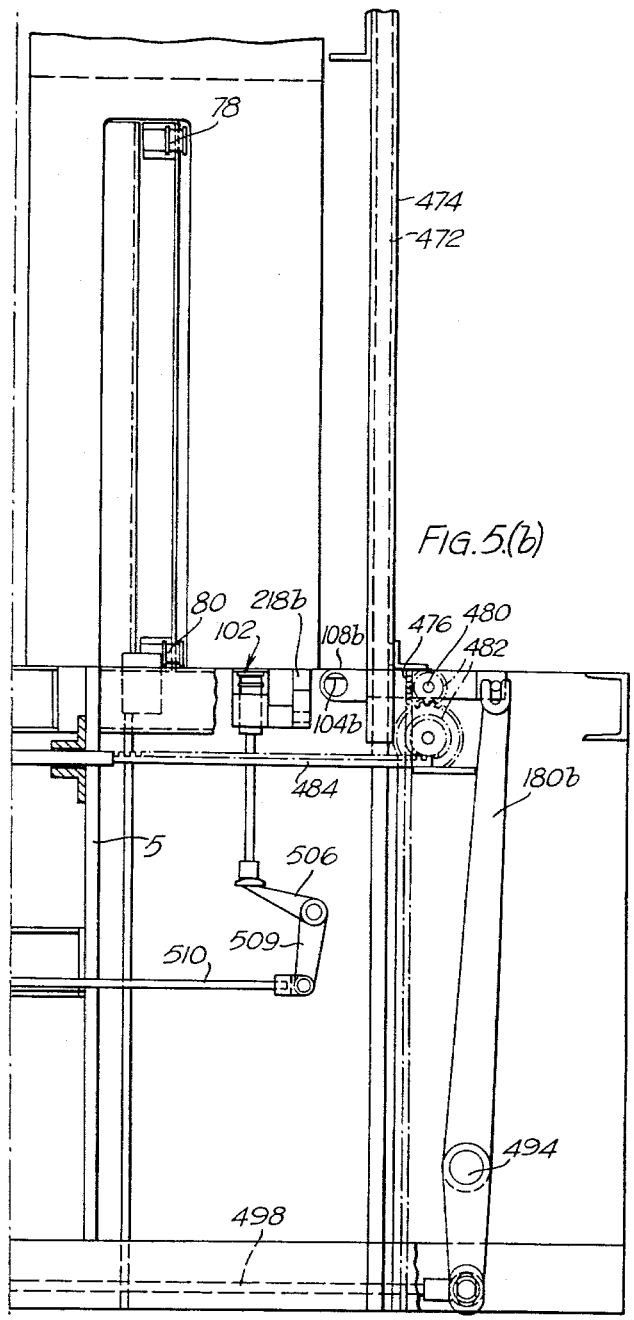

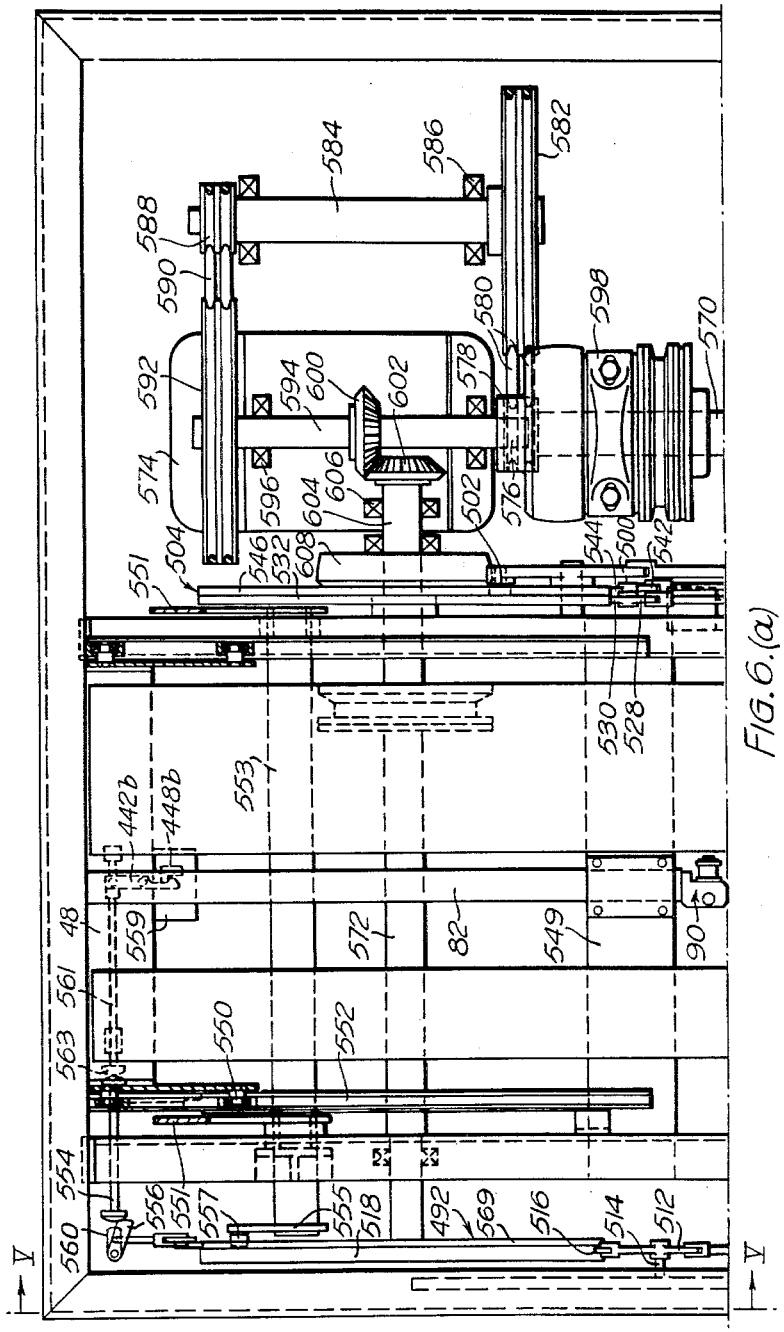

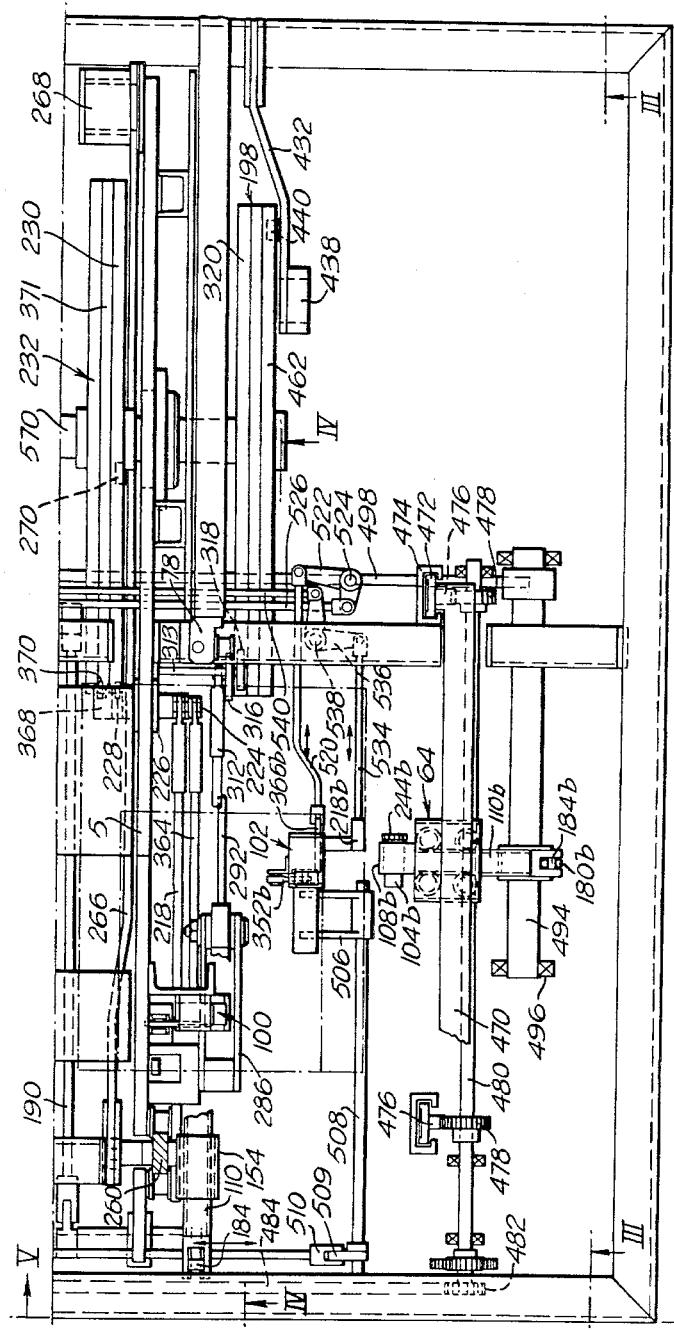

Jan. 11, 1966  J. W. G. WALTERS  3,228,321
PARCEL TYING MACHINE
Filed Feb. 13, 1964  14 Sheets-Sheet 13
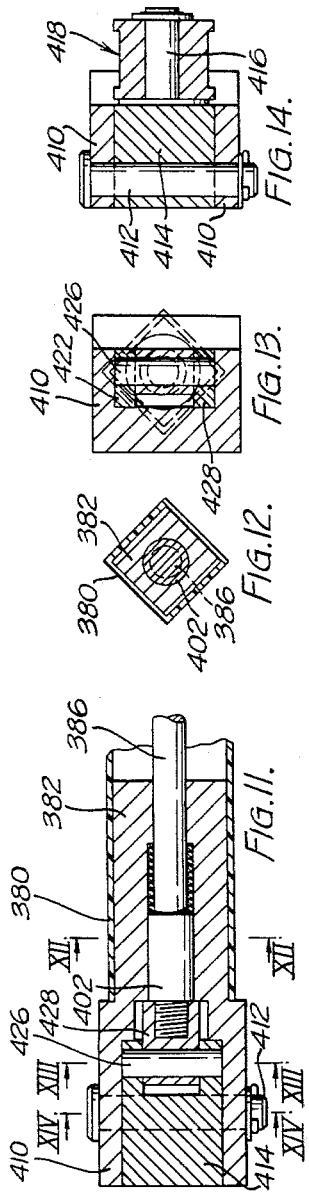
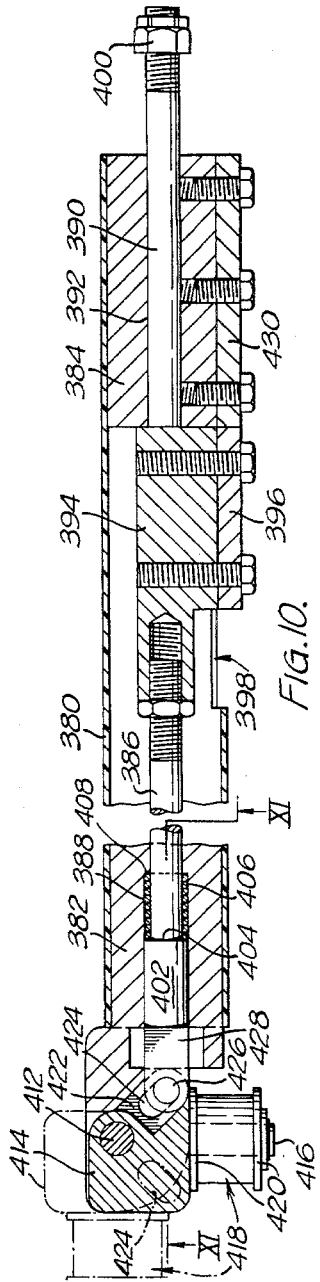
Inventor:
John Walter Gray Walters
By Baldwin & Wight
Attorneys United States Patent Office 3,228,321
Patented Jan. 11, 1966

3,228,321
PARCEL TYING MACHINE
John Walter Gray Walters, Crowborough, England, assignor to Sheridan Service Company Limited, London, England, a corporation of England
Filed Feb. 13, 1964, Ser. No. 344,761
Claims priority, application Great Britain, Feb. 18, 1963, 6,439/63
22 Claims. (Cl. 100—17)

This invention relates to a bundle tying machine and in particular, but not essentially, to a bundle tying machine which applies two ties at right angles to each other about a bundle.

According to the present invention a bundle tying machine includes a bundle reception and support zone, means to draw a length of tying tape from a supply and to position it around at least half of the circumference of said zone preparatory to the reception of a bundle therein, said positioning means being adapted to disengage from the tape after a bundle has been positioned in said zone, whereby the tape lies around at least half of the circumference of the bundle, a gripper device adapted to grip a leading free end of the tape and movable to draw said free end across the remaining side or sides of the bundle in the zone, whereby the bundle is encircled by a loop of tape, means to secure the free end of the tape to the portion thereof leading from said loop back to the supply, and means to sever the secured loop from said portion.

The tying machine may include additional means to draw a second length of tying tape from a second supply and to position it around at least half of the circumference of the said zone, the two lengths of tape when positioned as aforesaid lying in planes at right angles to each other.

The tying machine may include means adapted to draw each length of tape from the supply and to position it around three sides of the bundle reception and support zone.

Preferably each tape positioning means comprises a pair of draw arms to pull the tape across the bundle reception and support zone while the free end of said tape is held stationary. The arms may be mounted for straight line reciprocating movement across a pair of opposite sides of the bundle reception and support zone.

Each draw arm may comprise an outer sleeve, to one end of which a tape engaging finger is pivotally mounted and an actuating rod slidably contained in said sleeve and coupled to the finger, whereby upon relative displacement between the sleeve and the rod, the finger is swung between its operative and its inoperative positions. The outer sleeve and the actuating rod of each pair of draw arms may be respectively connected by cross bars for simultaneous displacement.

A tape gripper head may be provided reciprocably movable across the fourth side of the bundle reception and support zone and this head may include tape gripping mechanism rotatably mounted therein and adapted to be rotated through one revolution during reciprocating movement of the gripper head in a bundle tying cycle.

Preferably the tape gripping mechanism comprises a cylindrical block housed in a cylindrical bore in a nose of a sleeve longitudinally slidable in a carrier, a gripping pawl rotatably mounted on an end face of said block and a projection from said end face providing a gripping surface against which the tape is adapted to be trapped and held by the gripping pawl.

To insure that a loop of tape applied around a bundle is pulled taut, the machine may be provided with a strainer adapted to apply a pull on said loop prior to securing the free end of the tape.

The free end of the tape may be secured to the length thereof running back to the supply by being knotted thereto, but preferably this securing is obtained by a welding or heat sealing operation. A high frequency or ultrasonic welding technique may be employed. To perform a welding operation there may be provided an anvil, a back-up plate, said anvil and back-up plate being movable between operative and inoperative positions, and means to apply heat or vibration to the overlapped areas of tape trapped between said anvil and back-up plate when they are in their operative positions. A knife may be provided adjacent the back-up plate to sever the length of tape leading back from the weld to the supply.

Conveniently a drive for the various operating mechanisms of the machine may be provided by a single electric motor coupled through one or more electromagnetic clutch mechanisms to one or more cam shafts, a plurality of cam discs being mounted on said cam shafts and each providing one or more cam tracks which, through linkage, are connected to the various operating mechanisms.

In the instances where the bundle to be tied comprises a stack of newspapers or other sheets of material, it is desirable to provide the machine with a pneumatic or hydraulic ram connected to a pressure plate which can be actuated to apply a compression load to the bundle during the tying thereof.

An embodiment of the present invention is now described by way of example with reference to the accompanying drawings in which.

Figure 1:
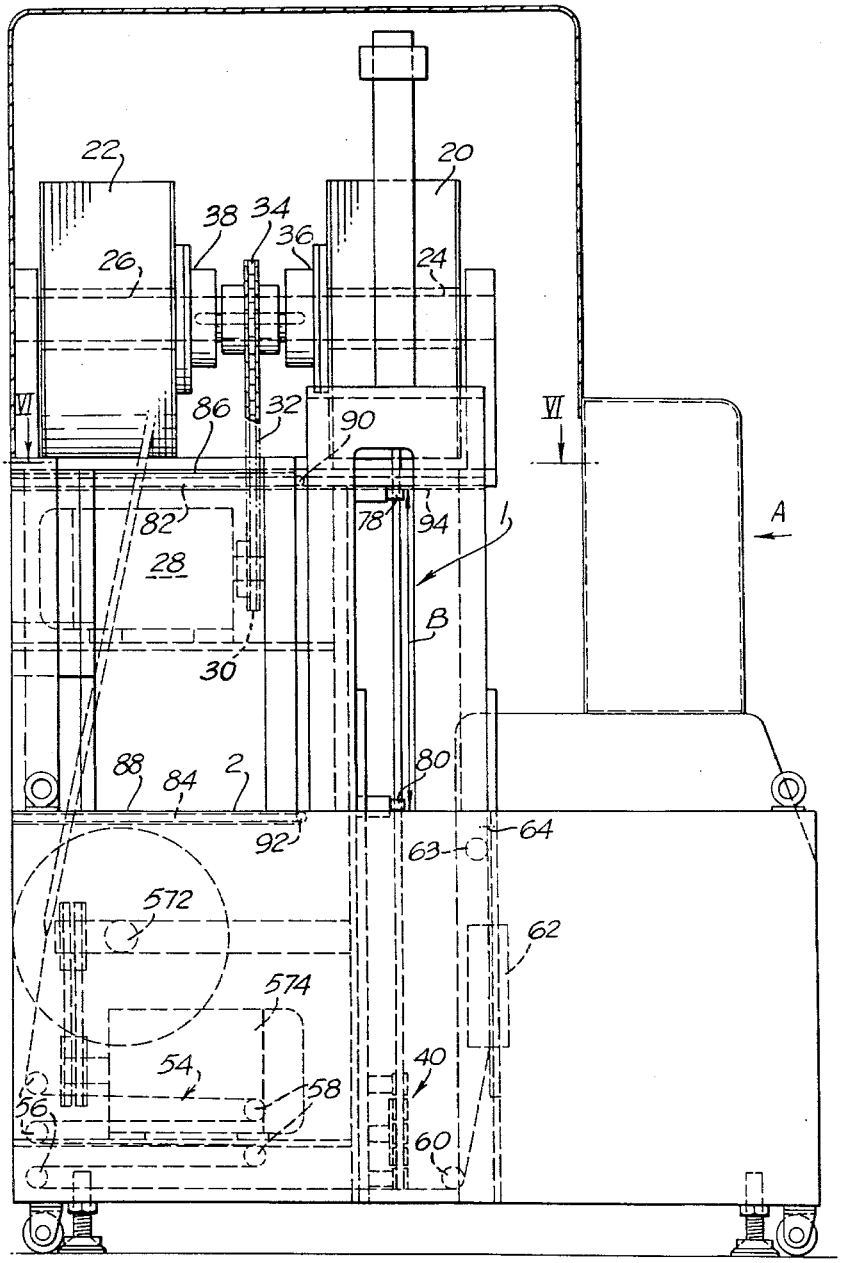
FIGURE 1 shows schematically a side elevational view of a bundle tying machine, with part of the outer casing thereof removed.
Figure 2:
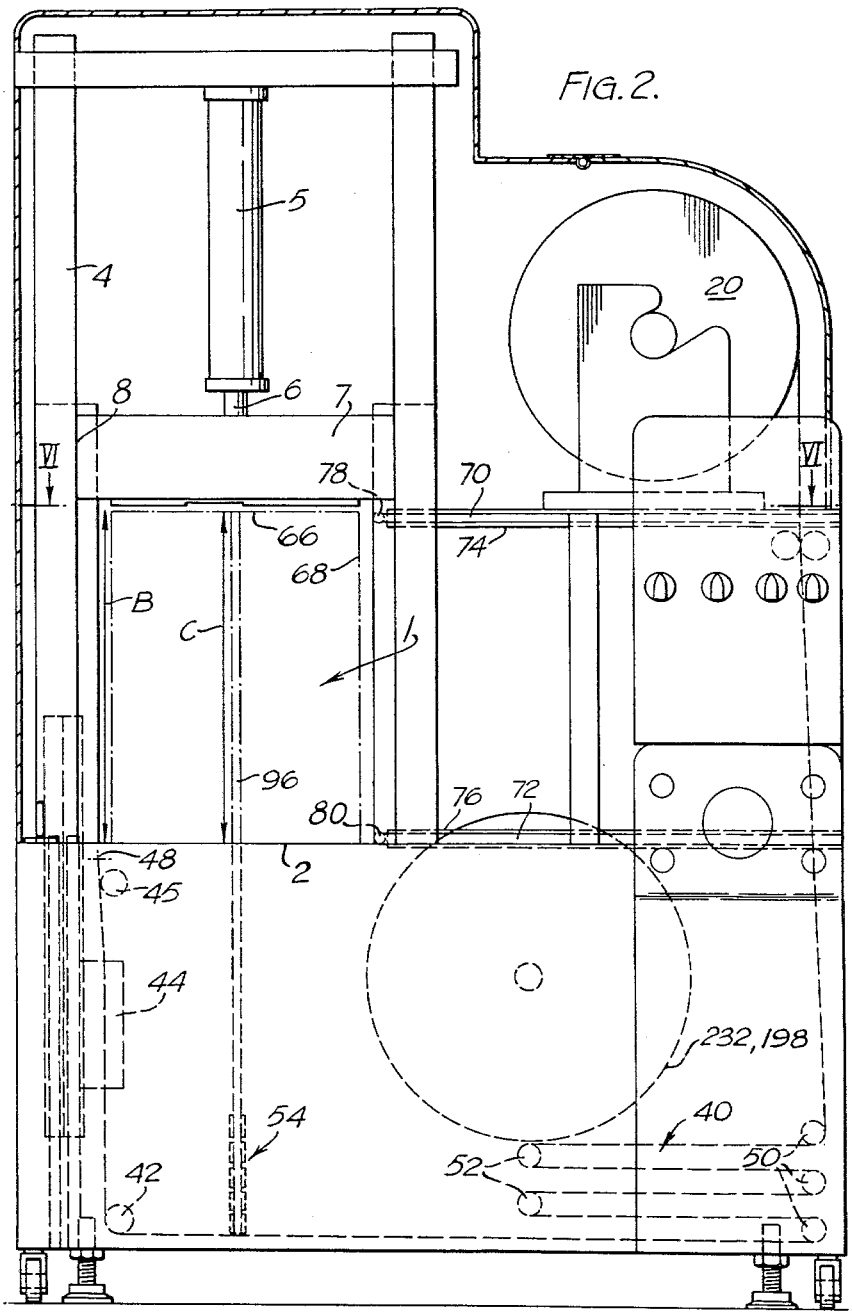
FIGURE 2 shows schematically a front elevation of the machine, with part of the outer casing thereof removed.
Figure 3B:
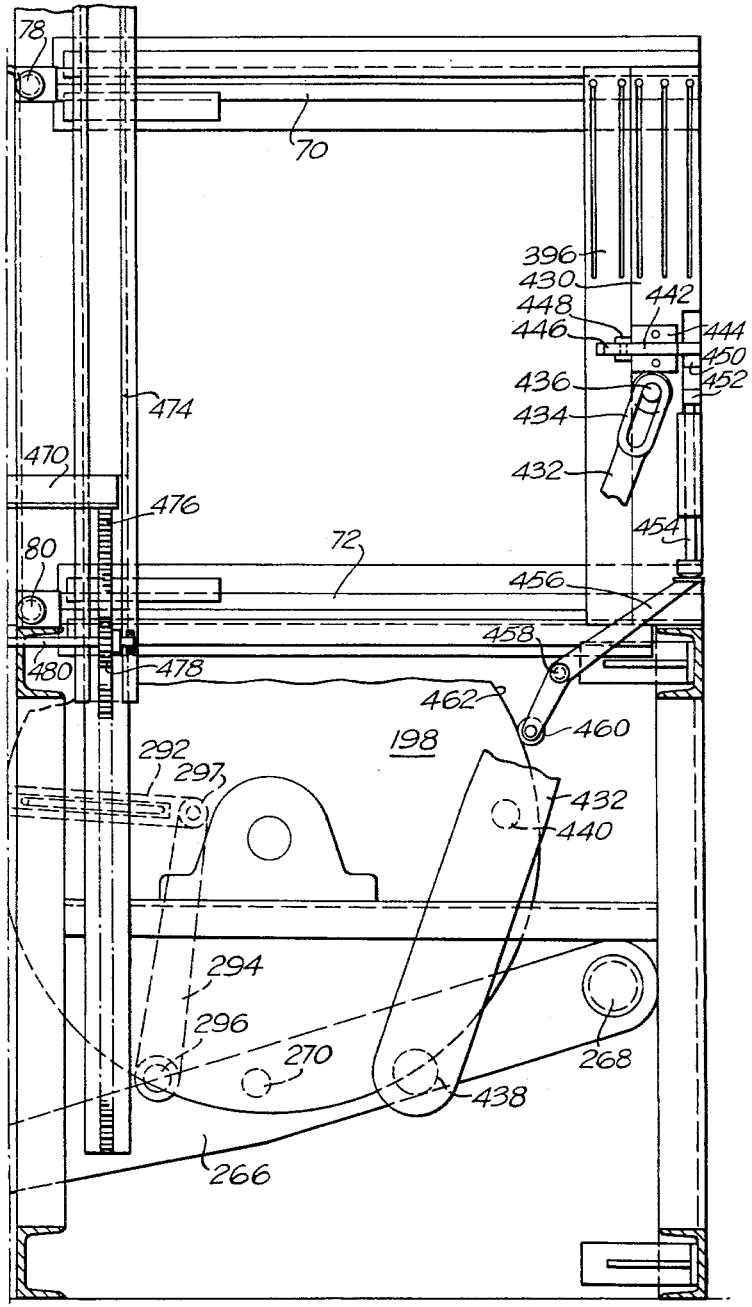
Figure 7:
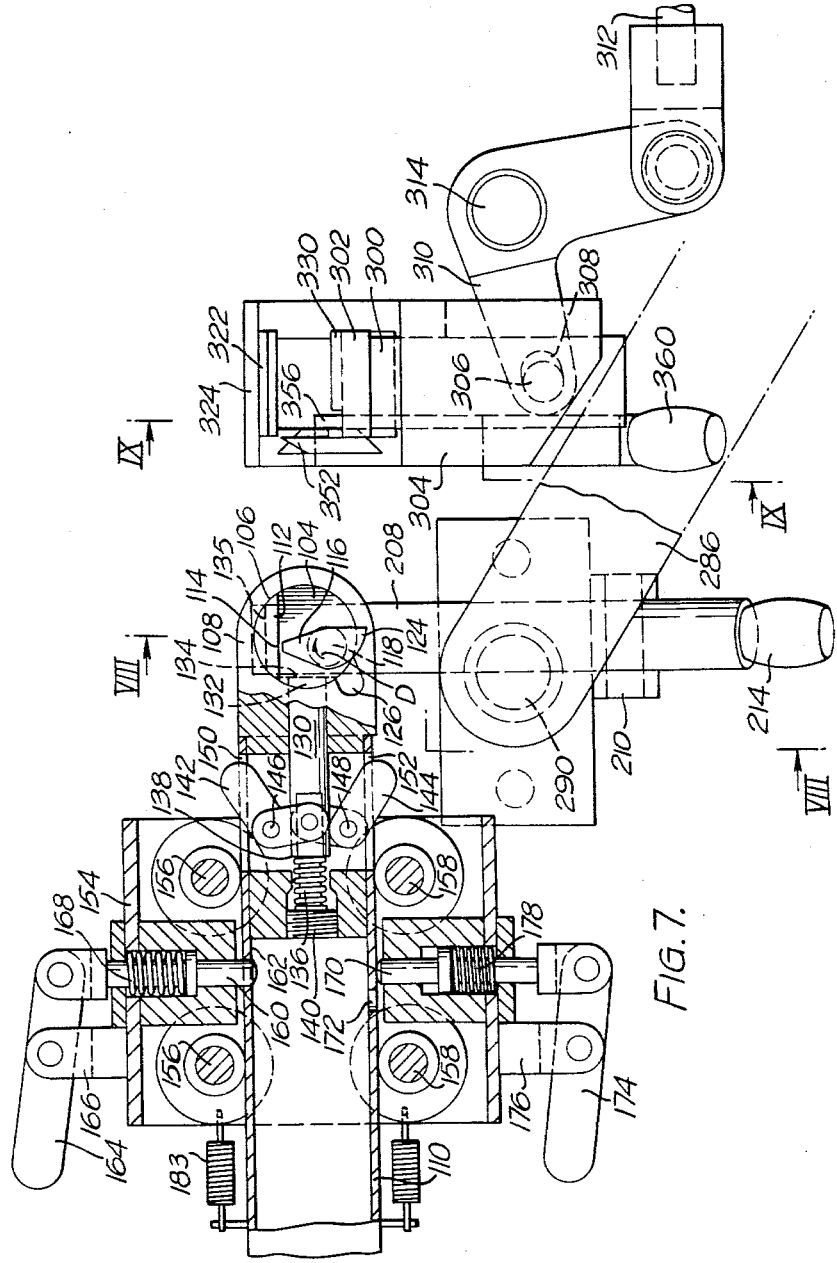
Figure 9:
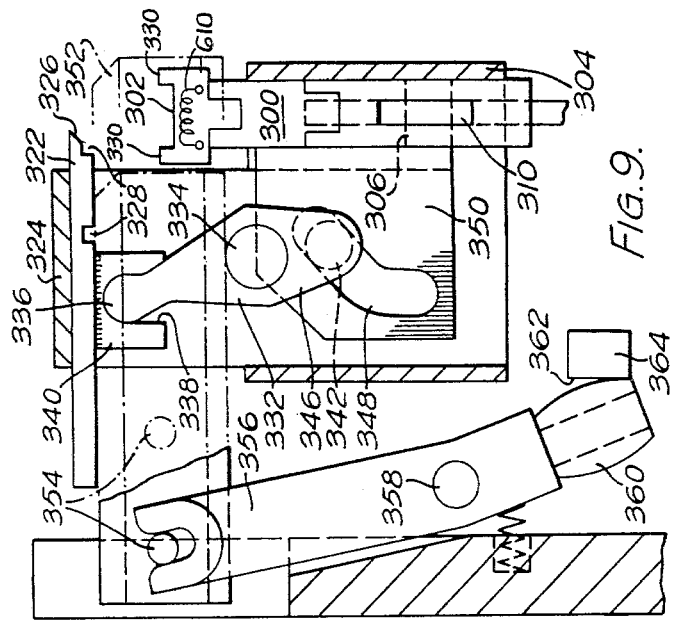
Figure 8:
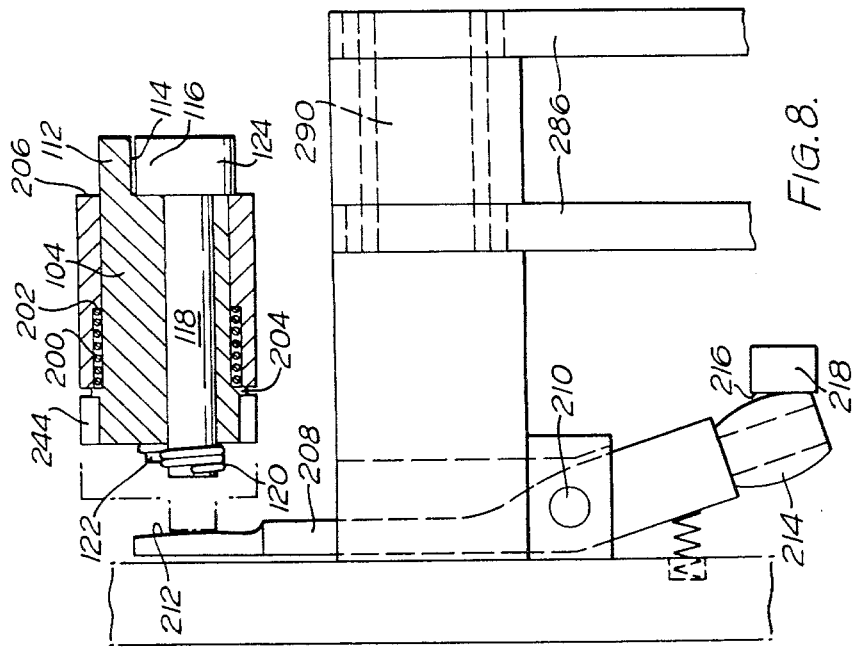
Figure 15:
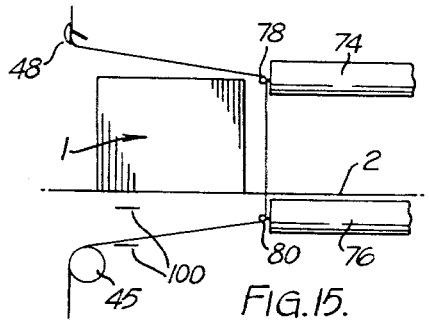
Figure 16:
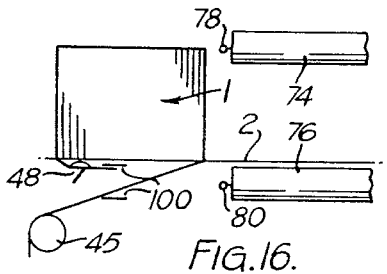
Figure 17:
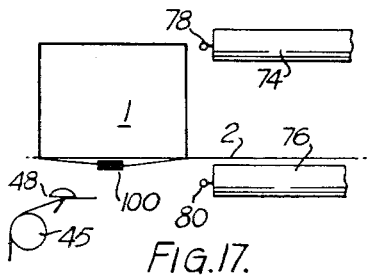
Figure 18:
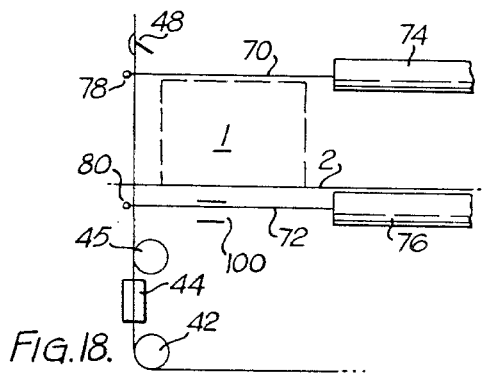

FIGURES 3(a) and 3(b) when taken together show a vertical side elevation along the lines III—III of FIGURE 6(b);

FIGURES 4(a) and 4(b) when combined show a vertical side elevation along the lines IV—IV of FIGURE 6(b);

FIGURES 5(a) and 5(b) together show a vertical side elevation along the lines V—V of FIGURES 6(a) and 6(b);

FIGURES 6(a) and 6(b) together show a plan view along the lines VI—VI of FIGURES 1 and 2;

FIGURE 7 shows a part sectional view on an enlarged scale of a tape gripper head and a welding mechanism employed in the bundle tying machine;

FIGURE 8 is a sectional view along the line VIII—VIII of FIGURE 7;

FIGURE 9 is a part sectional view along the line IX—IX of FIGURE 7;

FIGURE 10 is a longitudinal horizontal section on an enlarged scale of a draw arm of the bundle tying machine;

FIGURE 11 is a section along the line XI—XI of FIGURE 10;

FIGURE 12 is a section of the draw arm along the the line XII—XII of FIGURE 11;

FIGURE 13 is a section of the draw arm along the line XIII—XIII of FIGURE 11;

FIGURE 14 is a section along the line XIV—XIV of FIGURE 11; and

FIGURES 15–18 shows schematically various stages in a tying cycle.

Referring to FIGURES 1 and 2, the tying machine includes a bundle reception and support zone, generally indicated at 1. At this zone there is a support surface or table 2 and the bundle is moved into and through the machine in the direction indicated by the arrow A. Movement of a bundle into the reception and support zone is by a roller conveyor (not shown) provided with an intermittent drive, whereby a bundle is moved into said zone to a registered position, remains stationary therein while it is being tied and then, after completion of the tying operation, is moved out of the zone and the machine. Suitable guide members (not shown) are provided to ensure that the bundle is located centrally within the zone, such guide members being adjustably mounted to the main frame 4 of the apparatus.

The bundle to be tied may take a variety of forms and the machine illustrated in the accompanying drawings, and now to be described, is intended for the tying of a stack of newspapers or similar sheet material, for example multiple paper sacks. It is, therefore, desirable that during the tying of a stack of newspapers, the stack shall be compressed and so held. To this end a pressure ram 5 comprising a hydraulic or pneumatic cylinder and piston is vertically mounted in the main frame 4 above the bundle reception and support zone 1. A piston rod 6 is connected to a ram plate 7 slidably mounted in guides 8 carried by the main frame 4.

The machine is intended to apply two ties around a bundle, the ties lying in planes normal to each other; thus one tie in effect lies in the transverse plane of the bundle and the other tie in the longitudinal plane, and it is the longitudinal plane that is parallel to the direction of movement of a bundle through the machine. The ties are made with tape withdrawn from separate supplies in the form of reels 20 and 22 carried by support shafts 24 and 26 mounted on the main frame 4. To assist in withdrawal of tape from these reels 20 and 22, which may be of substantial diameter and weight, a drive is provided for the shafts 24, 26 by an electric motor 28, on the drive shaft of which a sprocket 30 is mounted. An endless chain 32 is entrained around the sprocket 30 and a sprocket 34. This sprocket 34, through electro-magnetic clutch and brake mechanisms 36 and 38, imparts a drive to the shafts 24 and 26 respectively.

Considering the tape withdrawn from the reel 20, this is entrained down and around tensioning means 40, around a guide roller 42, through a strainer 44, past a guide roller 45 to a gripper head 48. The tensioning means 40 comprises three rolls 50, freely rotatable about fixed axes, and a pair of rollers 52 freely rotatable on a carriage 53 (see FIG. 4(b)) slidable in the main frame 4 for straight line movement towards and away from said rolls 50. The carriage is connected to coil tension springs (not shown) anchored on the main frame 4. Thus the carriage is biased away from the rolls 50 but can be moved against the load of the tensioning springs towards said rolls 50.

The tape withdrawn from the second reel 22 is entrained around tensioning means 54 (FIG. 1), comprising rolls 56 and rollers 58 of like construction and arrangement as the tensioning means 40, around a guide roller 60 through a strainer 62, past a guide roller 63 to a gripper head 64.

The two gripper heads 48 and 64 are of similar construction and will be described in detail hereinafter, and during the course of operation of the machine to tie a bundle, the two heads move in similar manner but, of course, in different paths. The gripper head 48 has a vertical reciprocating movement up and down the path indicated by the arrow B, and the gripper head 64 has similar movement but up and down the path indicated by the arrow C.

At the commencement of a cycle of operation to tie a bundle, the gripper head 48 is at the top of its path B with a reach of tape extending down said path to the strainer 44 and tape positioning means are actuated to draw the reach of tape into a position so that it lies around three sides of the bundle reception and support zone 1, i.e. along the sides 66 and 68, indicated by the chain lines in FIGURE 2, and along the side represented by the bundle support table 2.

The tape positioning means comprises a pair of draw arms 70 and 72 (to be described in greater detail hereinafter with reference to FIGURES 10–14) slidably mounted in guideways 74, 76 mounted on the main frame 4. The arms 70 and 72 lie in a plane containing the path B and normal to the path A of a bundle through the machine. At the free end of each draw arm 70, 72 there is provided a tape engagement finger 78, 80. These fingers are pivotally mounted on their respective draw arms so that when in an operative, tape engaging position they extend at right angles to the longitudinal axes of their respective arms, and when in inoperative tape dis-engaging positions, they extend forward, parallel to said axes.

A second pair of draw arms 82 and 84 are slidably mounted in guideways 86 and 88 mounted on the main frame 4 of the machine. These arms 82 and 84 lie in a plane containing the path C and normal to the plane containing the arms 70 and 72, and are provided with tape engaging fingers 90 and 92 mounted for similar pivotal movement as just described with respect to the fingers 78, 80.

Thus, upon operation of the two pairs of arms 70, 72, 82, 84, the two reaches of tape withdrawn from the supplies 20 and 22 and moved by the gripper heads 48 and 64 to lie along the paths B and C, are drawn by the draw arms 70 and 72, 82 and 84 each to lie about three sides of the bundle reception and supporting zone 1, the tape held by the gripper head 48 lying, as just described, around the sides 66 and 68 and along the side represented by the table 2, and the tape from the supply 22 held by the gripper head 64 to lie around the sides indicated at 94, 96 and along the table 2. As can be seen in FIGURES 1 and 2, the draw arms 82 and 84 are spaced further apart than are the draw arms 70 and 72 and consequently the tape along the sides 66, 68 and table 2 lies within the tape along the sides 94, 96 and table 2.

After the two lengths of tape have been positioned as just described, each around three sides of the bundle reception and support zone 1, the machine is now prepared and ready to receive and tie a bundle placed in said zone. When a bundle is so placed, lengths of the tape held by the fingers 78, 80 and 90, 92 are released and immediately both gripper heads 48 and 64 descend to positions at the bottoms of their paths of movement. As they do so, each draws the tape it is holding down a fourth side of the bundle to bring the free end of the tape held by the gripper head into a position to be secured to the length of tape running back past the guide rollers 45, 63 and through the strainer 44 or 62. The bundle is now encircled by two loops of tape.

Each loop of tape may be secured by a tying operation in which case a suitable knotter mechanism of known construction would be appropriately positioned below the bundle support table 2. The machine illustrated in the accompanying drawings, however, is intended for use with tape which can be welded and, therefore, instead of knotter mechanisms, welding heads are provided, and these are indicated at 100 and 102 in FIGURE 6(b). As will be described, each welding head comprises an anvil and a back-up tongue, between which the portions of tape to be joined are clamped, and means to perform a welding operation. Each welding head also is provided with a knife to sever that portion of the tape running back past the guide roller 45 or 63, through the strainer 44 or 62, thereby forming a new free end of tape which, as will be described, is gripped by the gripper head 48 or 64.

The strainers 44 and 62 are provided to ensure that each loop of tape applied around the bundle is pulled taut. Each strainer, as will be described, comprises a pair of clamping shoes which grip the tape running down from the bundle to the guide roller 42 or 60, and pull the tape back away from the bundle immediately before the welding head 100 or 102 comes into operation.

The different components of the machine are now described in detail and reference is first made to FIGURES 7 and 8 which show views of a gripper head. It is to be understood that the two gripper heads 48 and 64 are of like construction and operated in the same manner. Referring to FIGURES 7 and 8 a cylindrical block 104 is rotatably mounted in a bore 106 of a nose 108 carried at one end of a sleeve 110 (see FIG. 6(b)). A projection 112 in the form of a chord segment of the cylindrical block 104 provides a tape gripping surface 114, and tape is trapped against this surface by a gripping pawl 116. This pawl 116 is carried by a shaft 118 rotatably mounted in and extending through the cylindrical block 104. The shaft 118 is biased for angular movement in the direction indicated by the arrow D by a coil spring 120 anchored at one end to said shaft and at its other end to an abutment 122 fixed to the cylindrical block 104. As can be seen in FIGURE 8 the coil spring 120 is carried by the shaft 118 at its end remote from the pawl 116. The spring 120 serves to bias the shaft 118 for angular movement to bring the pawl 116 against the gripping surface 114.

The pawl 116 has a heel 124 and this is received in a cavity 126 opening from the bore 106 when the cylindrical block 104 is rotated within the bore 106 to bring said heel and cavity into register.

Not only is the block 104 rotatable in the bore 106 but it is also slidable therein. Thus, when the heel 124 registers with the cavity 126, the block 104 may be moved axially as will be described, thus withdrawing the projection 112 into said bore 106.

The cylindrical block 104 is locked in the position shown in FIGURE 7, with the heel 124 out of register and engagement with the cavity 126, by a slidable latch piece 130, the free end 132 of which engages in a radial recess 134 in the peripheral surface of said block 104. In this angular position of the block 104, the gripping surface 114 is horizontal. A radial flat 135 is provided in the block to lock it after 90° of angular displacement to bring the surface 114 to the vertical position.

The latch piece 130 is slidably mounted in the sleeve 110 and is biased into engagement with the recess 134 or the flat 135, as the case may be, by a compression coil spring 136 trapped between an annular shoulder 138 on the latch piece and an abutment 140 fixed relative to the sleeve 110.

Movement of the latch piece 130 against the bias of the coil spring 136 is afforded by bell crank release fingers 142 and 144. These fingers are pivoted at 146 and 148 respectively to the sleeve 110, and project to the exterior thereof through slots 150 and 152. Thus, when either finger 142 or 144 is depressed into the interior of the sleeve 110, the latch piece 130 is moved to the left as shown in FIGURE 7 so that its free end 132 is moved out of engagement with the recess 134 or the flat 135, as the case may be, in the cylindrical block 104.

The sleeve 110 is mounted for longitudinal axial movement in a carrier 154, the sleeve being held between two pairs of freely rotatable support wheels 156, 158. The sleeve has three positions, a forward, an intermediate and a retracted position, and it is shown in its retracted position in FIGURE 7. It is locked in this position by engagement of a detent 160 engaging in an aperture 162 in the wall of said sleeve. The detent 160 projects to the exterior of the carrier 154 and at its outer end is pivotally attached to a trip lever 164, which in turn is pivotally mounted in a bracket 166 carried by said carrier 154. Said detent 160 is biased to engage in the aperture 162 by a compression coil spring 168.

The sleeve 110 is locked in its intermediate position by the engagement of a detent 170 in an aperture 172 in the wall of said sleeve. As with the detent 160, the detent 170 also projects to the exterior of the carrier 154 and at its outer end is pivotally attached to a trip lever 174, which in turn is pivotally mounted in a bracket 176 on the carrier 154. A compression coil spring 178 biases the detent 170 into engaging in the aperture 172.

Movement of the sleeve 110 between its forward and retracted positions is through a yoke arm 180 (see FIGURE 4(a)) having a forked end 182 engaging with a pin 184 fixed to the sleeve 110. To facilitate a limited amount of vertical movement of the carrier 154 and sleeve 110 while the pin 184 is engaged by the yoke arm 180, the forked end 182 is provided with a vertical slot 186. Movement of the sleeve 110 from its retracted to its intermediate position is, at a certain stage in the operation of the machine, under the bias of tension springs 183 connected between the sleeve and the carriage 154. This is described in detail hereinafter.

The yoke arm 180 is pivoted at 188 to the main frame 4 of the machine and is at its free end pivotally connected to a push-pull rod 190. A lever 192 (see FIG. 4(b)), which is pivoted at its base 194 to the main frame 4, is connected to the rod 190, and carries a cam follower 196 which rides in a cam track in a side face of a cam disc 232 (see FIG. 6(b)). Thus, according to the profile of the cam track, the yoke arm 180 can be rocked back and forth thus sliding the sleeve 110 back and forth in the carrier 154.

As hereinbefore mentioned, the cylindrical block 104 is axially slidable in the bore 106 of the head 108. Referring to FIGURE 8 sliding movement to the left to retract the projection 112, when the heel 124 is in register with the cavity 126, is under the influence of a compression coil spring 200 trapped between an annular abutment 202 in the bore 106 and an annular shoulder 204 around the cylindrical block 104. Axial sliding movement of the block 104 occurs while the latch 130 is in engagement with the recess 134 and this is facilitated by forming said recess as an elongated slot.

The cylindrical block 104 is held in its normal position with the projection 112 extending, as shown in FIGURE 8, from the head 108, by engagement of the inner side face of the heel 124 with the side face 206 of said head 108. The block 104 is pushed from its retracted position to its extended position against the bias of the spring 200 by a pedal lever 208 pivotally attached at 210 to the main frame 4 of the machine. This pedal lever 208 has a head 212 which bears against the end of the shaft 118 carrying the tension spring 120. A barrel roller 214 is rotatable on the end of the pedal lever 208 remote from the head 212 and this is acted upon by an inclined face 216 of a push-pull bar 218 slidably mounted in the main frame of the apparatus. The end of the bar 218 remote from that having the inclined surface 216, is pivotally coupled to a lever 220 (see FIG. 4(b)) fast on a sleeve 222 rotatably mounted around a shaft 224 and within a bearing 226 (see FIG. 6(b)) carried by a member of the main frame 4. The sleeve 222 and shaft 224 extend through the frame member and a second arm (not shown) carried by said sleeve mounts a cam follower 228 engaging with a peripheral cam track 230 on the cam disc 232. Thus, when the cam disc 232 rotates, as will be described, according to the profiling of the cam track 230, so reciprocating straight line movement is imparted to the push-pull bar 218 and hence the pedal lever 208 may be caused to rock to push on the end of the shaft 118 and so move said shaft, together with the cylindrical block 104, against the bias of the coil spring 200 to bring said cylindrical block 104 into its extended position shown in FIGURE 8. The pedal lever 208 and bar 218 are biased against movement by cam action by springs (not shown) connected between them and the main frame 4.

The release finger 144 serving to withdraw the latch 130 is actuated by a fixed abutment 240 carried by the main frame of the apparatus. The release finger 142 is actuated by a fixed abutment 242 also carried by the main frame 4 of the machine. These abutments are to be seen in FIGURE 4(a) and it is to be noted that the abutment 240 is at the bottom of the path of movement B while the abutment 242 is at the top of said path.

A pinion 244 (FIGURE 8) is fast on the cylindrical block 104 and by being brought into engagement at the appropriate times with a short rack 246 located adjacent the bottom end of the path of movement B and a longer rack 248 located at the top end of said path of movement, so said cylindrical block 104 can be rotated through 360°. The rack 246 is of sufficient length to impart a 90° angular displacement to the block 104 and the rack 248 imparts a 270° angular displacement.

Actuation of the detent lever 174 is by a fixed abutment pad 250 (see FIG. 4(a)) carried by the main frame 4 of the machine and located adjacent the bottom of the path of movement B. Actuation of the detent lever 164 is by an abutment pad 252 located at the top of said path of movement. It will be appreciated that once the detents 160 and 170 have been disengaged from their respective apertures 162 and 172 and the sleeve 110 axially moved so that said detents and apertures are no longer in register, the inner ends bear against the outer surface of the sleeve 110 and are poised under the bias of the springs 168 and 178 ready to re-engage with the apertures as soon as register is re-accomplished by axial movement of the sleeve 110.

The carriage 154 is mounted on the upper end of an elongated carrier block 260 (see FIG. 4(a)) slidable in vertical guideways 262 mounted on the main frame 4 of the machine. The lower end of the block 260 is pivotally attached at 264 to a swing arm 266 pivotally attached at 268 (see FIG. 3(b)) to the main frame 4. A roller cam follower 270 on the swing arm 266 rides in a cam track formed in a side face of the cam disc 232 (see FIG. 6(b)). Thus, upon rotation of said cam disc 232, according to the contour of the cam track so the block 260 and carriage 154 are caused to move along the vertical path B.

The tape as it runs up from the guide roller 42 to the gripper head 48 passes through a strainer 44. The strainer comprises a pair of face to face gripper shoes 272 (see FIG. 3(a)) of similar construction, the opposed faces of which are formed to afford a good grip on the tape. The shoes are biased apart by compression springs (not shown). Pins 274, extending from the sides of the shoes 272, lie in slots 276 in the arm of a U-plate 278. The shoes are slidably mounted in a guideway 280 having opposed cam faces 282, which, as can be seen in FIGURE 3, have a comparatively wide upper portion and a comparatively narrow lower portion joined by a throat 283 at which the cam faces 282 are inclined towards each other. The outer faces 284 of the shoes 272 bear against the respective cam faces 282 so that as the shoes are moved vertically in the guideway 280, they are caused to move together as they move vertically downwardly, and to move apart as they move vertically upwardly, by the throat 283.

Vertical movement of the shoes 272 is by toggle arms 286 one of which is pivotally connected to the U-plate 278 and the other of which is pivotally attached at 290 to the main frame 4 of the machine. The arms 286 where they are pivotally connected together are also pivotally connected to a push-pull rod 292, which in turn is connected to a swing lever 294, pivotally connected at 296 to the main frame 4 of the machine. A cam follower 297 attached to the swing arm 294 rides in a cam track (not shown) in a side face of the cam disc 198. Thus, when the said cam 198 rotates the push-pull rod 292 is moved back and forth so tending to spread apart or pull together the toggle arms 286. As these arms are spread apart so the U-plate 278 and shoes 272 of the strainer 44 are moved vertically downwardly, whereby the tape lying between said shoes is gripped and pulled down. As the toggle arms 286 are closed or pulled together so U-plate 278 and shoes 272 are moved vertically upward and allowed to move apart, so releasing the tape.

The free end of a loop of tape applied around the bundle is welded to that portion of the tape running back from the bundle to and through the strainer 44. Welding mechanism is appropriately located below the bundle support table 2 and is illustrated in FIGURES 7 and 9. This mechanism comprises an anvil 300 formed with a recessed head 302 in which the two portions of tape to be welded together face to face may be brought to lie. Suitable known heat applying means, indicated diagrammatically in FIG. 9 by a high frequency heating coil 610, may be provided within the anvil head 302. The anvil 300 is mounted for vertical sliding movement in a support bracket 304 fixed to the main frame of the machine. To impart this sliding movement, the anvil carries a pin 306 engaging in a slot 308 in one arm of a bell crank lever 310, the other arm of which is pivotally connected to one end of a push-pull rod 312, the bell crank lever being rotatably mounted on a stub shaft 314 fixed to the main frame 4 of the machine. The other end of the push-pull rod 312 is connected to a lever 316 fast on a pin 313 (see FIG. (6b)). A cam follower 318 is mounted on said lever 316, which cam follower bears against a peripheral cam track 320 on the cam disc 198. Thus, upon rotation of said cam disc 198, the bell crank lever 310 is caused to rock back and forth so moving the anvil 300 up and down.

The bell crank lever 310 is biased by spring means (not shown) against this movement by cam action.

During the welding operation it is necessary to apply a back-up to the two-portions of tape being united and such back-up is provided by a tongue 322 mounted for horizontal sliding movement in the support bracket 304. As can be seen in FIGURE 9 this tongue 322 slides against the undersurface of a horizontal plate 324. The free end of the tongue is chamfered as indicated at 326 to facilitate easy entry of said tongue between the tape and the bottom surface of the bundle. The undersurface of the tongue 322 is recessed at 328 to accommodate the upstanding edges 330 of the anvil head 302.

The tongue 322 extends horizontalllly into its operative position simultaneously as the anvil moves vertically upwardly into its operative position. Such simultaneous movement is achieved by coupling the tongue to the anvil by a rocking lever 332 pivoted on a stub shaft 334 carried by the support bracket 304. A rounded head 336 of the rocking lever 332 engages in a socket 338 of a plate 340 depending from and fixed to the tongue 322. A pin 342 carried by a tail 346 of the rocking lever 332 engages in an angled slot 348 formed in a plate 350 fixed to the anvil 300. Thus, as the anvil moves upwardly, the lever 332 is caused to rock, thereby pushing the tongue 322 into its operative position.

After the weld has been formed it is necessary to sever that length of tape running back from the weld to the strainer 44 and it is desirable that such severance should be performed very close to the weld. To this end a knife 352 is provided mounted for horizontal sliding movement in the support bracket 304 alongside the tongue 322. A cutting edge is provided at the head of the knife and a pin 354, engaged by the forked upper end of an arm 356, is provided at the tail of the knife. The arm 356 can rock about a shaft 358 fixed to the main frame 4 of the machine. A barrel roller 360 is rotatably mounted on the lower end of the arm 356 and is engaged by an inclined cam face 362 of a push-pull rod 364, which is pivotally connected to an arm 366 fast on the shaft 224 which carries a second arm 368. A roller cam follower 370 is mounted on the second arm 368 and bears against a peripheral cam track 371 on the cam disc 232.

Thus, according to the profiling of the cam track, so the rod 364 is moved back and forth, thereby rocking the arm 356 and sliding the knife 352 in and out of the support bracket 304. Spring means (not shown) are provided to bias the arm 356 and rod 364 against movement by cam action.

Considering the tape preparing arms 70 and 72, each comprises a rectangular sectioned arm 380 (see FIG. 10) closed at each end by blocks 382 and 384. A rod 386 is slidable in a bore 388 in the block 382 and a rod 390 is slidable in a bore 392 in the block 384. The two rods 386 and 390 are co-axial and are joined through an intermediate block 394 and the two intermediate blocks of the arms 70 and 72 are coupled together by a cross bar 396. To accommodate the cross bar 396, the wall of each tube 380 has apertures as indicated at 398. One end of the rod 390 extends beyond the block 384 and is threaded to receive a nut 400, which, according to its positioning on the threaded end of the rod 390, limits movement thereof to the left, as shown in FIGURE 10.

A head 402 of increased diameter is fixed onto the outer end of the rod 386 remote from the intermediate block 394 and thus provides an annular shoulder 404 for one end of a compression coil spring 406, the other end of which bears against an abutment shoulder 408 provided by the bore 388. This compression coil spring 406 biases the assembly of rods 386 and 390 and intermediate block 394 to the left, as shown in FIGURE 10.

The block 382 protrudes beyond the end of the tube 380 and is slotted to provide two flanges 410, (see FIG. 14), between which a pivot pin 412 extends. Stub arm 414 is rotatably mounted on this pivot pin 412 and carries a stub shaft 416, on which a tape roller 418 is mounted for free rotation. As can be seen in FIGURES 10 and 14 the peripheral surface of this roller 418 has an annular groove to receive tying tape, the upstanding annular flanges 420 serving to prevent tape from running off the roller 418. Two shelves 422 formed integral with the stub arm 414 are slotted at 424 to receive a pin 426 carried by an arm 428 at the end of the head 402. The stub arm 414 is thereby coupled to the head 402 and rod 486 in such a manner that axial movement of the rod 486 to the left, as shown in FIGURE 10, will pivot the stub arm from the position shown in full lines to the position shown in chain lines. When in the position shown in full lines, the axis of the tape roller 418 lies normal to the longitudinal axis of the tube 380 (i.e. the arm 70 or 72) and this is the operative position. When the stub arm 414 is pushed to the position shown by the chain lines, the axis of the tape roller 418 lies parallel to the longitudinal axis of said tube 380 and this is the inoperative position. Movement of the stub arm from its operative to its inoperative position is under the bias of the coil spring 406. As the two arms 70 and 72 are connected together by the cross bar 396, it will be appreciated that the stub arms 414 of the two tape positioning arms 70 and 72 move simultaneously.

Not only are the two arms 70 and 72 connected together by the cross bar 396, but they are also connected together by a cross bar 430 which, as can be seen in FIGURE 10, is bolted to the blocks 384. Thus the tubes 380 of the two arms are united so that the arms 70 and 72 move simultaneously in their guideways 74 and 76.

Referring to FIGURE 2, the arms 70 and 72 slide back and forth in their guideways to move the gripper fingers 78 and 80 thereof from the positions shown in the full lines to positions in alignment with the path B of movement of the gripper head 48. Such sliding movement of the arms 70 and 72 is achieved by a swing arm 432 (see FIG. 3(b)) slotted at its outer end 434 to receive a pin 436 fast with the cross bar 430. The other end of the arm 432 is carried on a stub shaft 438 mounted to the main frame 4 of the apparatus. A roller cam follower 440 on the swing arm 432 engages in a cam track (not shown) in the cam disc 198; according to the profiling of the cam track, so when the cam disc 198 is rotated, the swing arm 432 is thrown back and forth, thus moving the cross bar 430 and the arms 70 and 72.

A latch 442 is mounted for rocking movement on a bracket 444 bolted to the cross bar 430 and has a nose 446 arranged to engage behind a latch piece 448 carried by the cross bar 396. It will be appreciated, therefore, that with the latch in engagement with the latch piece, the two cross bars 396 and 430 are locked together side by side as shown in FIGURE 10. When the latch is released, the cross bar 396, under the influence of the compression coil springs 406, moves away from the cross bar 430. Having regard to the foregoing description, when the two cross bars 396 and 430 are locked side by side, the tape fingers 78 and 80 are in their operative positions, extending normal to the longitudinal axes of the arms 70 and 72. When said cross bars are spaced apart, then the tape fingers are in their inoperative positions extending parallel to the longitudinal axes of the arms 70 and 72.

Release of the latch 442 is obtained by an inclined cam face 450 on a slidable bar 452 connected to a push rod 454, the end of which remote from the bar 452 is arranged to be pushed by a pedal lever 456 rotatably mounted on a stub shaft 458 fixed to the main frame 4 of the machine. A roller cam follower 460 is carried by the pedal arm 456 and bears against a peripheral cam track 462 on the cam disc 198.

The cam track is so profiled as to rock the pedal arm 456, whereby the latch 442 is released after a bundle has been placed in the reception and support zone 1. Spring means (not shown) are provided to bias the pedal arm 456 against this movement by cam action.

As the tape arms 70 and 72 move into their extended positions, the cross bar 396 moves against fixed abutments 464 (see FIG. 4(b)) and is stopped thereby. The cross bar 430, however, continues to move under influence of the swing arm 432 so that is brought up against the cross bar 396. The latch 442 thereupon re-engages with the latch pin 448 locking the two bars 396 and 430 together. As the bar 430 moves up against the bar 396 so the tape fingers are swung into their operative positions extending normal to the longitudinal axis of the arms 70 and 72.

Figure 4:
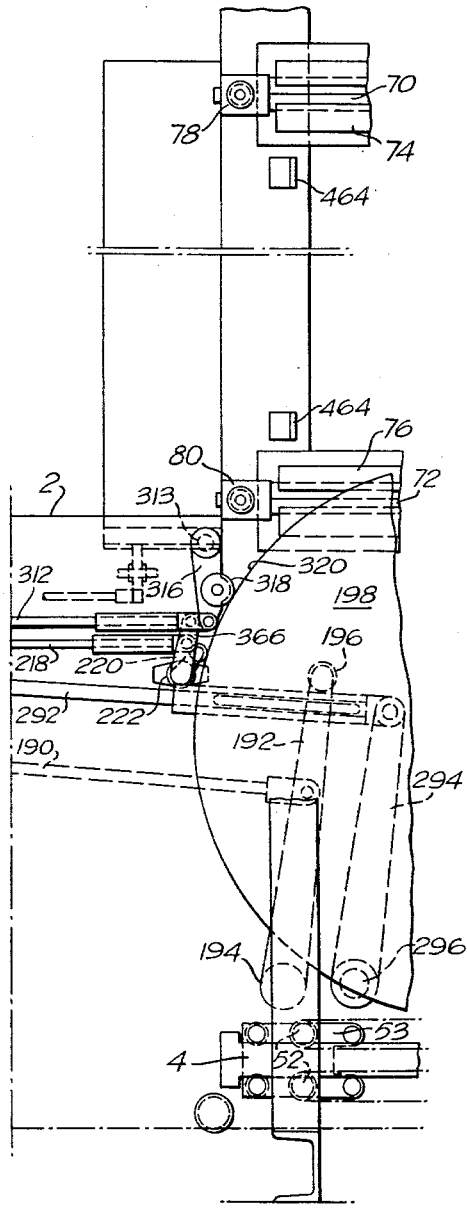

When the tape arms 70 and 72 are moved back to their withdrawn position as shown in FIGURE 4 the two cross bars 396 and 430 remain locked together.

As mentioned hereinbefore, the machine illustrated in the accompanying drawings is intended to apply two ties around a bundle. Consequently it is necessary to have two sets of tape arms, gripper heads, strainers and ancillary equipment. The second set of tape arms are those identified as 82 and 84 in FIGURE 1. To facilitate straight line movement of a bundle through the machine it is necessary for the mounting of these arms 82, 84 and the associated gripper head 64, although of basically the same construction as hereinbefore described with reference to the tape arms 70 and 72 and gripper head 48, to be modified.

Referring to FIGURE 3 and 6 the gripper head 64 is carried by a cross beam 470 attached to elongated guides 472 slidable in fixed ways 474 and each carrying a rack 476, which racks engaged by pinions 478 fast on a cross shaft 480. Thus by rotation of the shaft a drive is imparted to the racks 476, thereby lifting or lowering the guides 472 and cross beam 470. As can be seen in FIGURE 6(b) the cross beam extends transversely across the path movement of a bundle through the machine.

The shaft 480 through a gearing 482 is coupled to a further rack 484 slidable in the main frame 4 of the machine and moved by a throw arm 486 (see FIG. 5(a)) pivoted at 488 to the main frame 4. A cam follower 490 on the throw arm 486 engages in a cam track on a side face of a cam disc 492. Thus rotation of the cam disc 492 through the cam follower 490 and throw arm 486 imparts straight line sliding movement to the rack 484. It has been found necessary to raise and lower the cross beam 470 by a rack and pinion drive so as to limit the possibility of the guides 472 twisting and jamming in their ways 474. It is considered more convenient and practical to use a rack and pinion drive than to connect each guide 472 or the ends of the cross beam 470 to swing arms thrown directly by cam means.

The gripper head 64 carried by the cross beam 470 is of the same construction hereinbefore described with reference to FIGURES 7 and 8 and has a pinion 244$b$, which at appropriate times meshes with racks (not shown) corresponding to the racks 246 and 248. The pin 184$b$ (see FIG. 6($b$)) at the tail of the sleeve 110$b$ of the gripper head 64 is, when the gripper head 64 is at the bottom end of its path of movement, engaged by the forked end of a yoke arm 180$b$. This arm 180$b$ is divided into a top half and a bottom half. The top half is fixed to a cross shaft 494 rotatably mounted in bearings 496, said top half of the arm 180$b$ being in vertical alignment with the gripper head 64. The lower half of the yoke arm 180$b$ is fast on the shaft 494 adjacent one end and at its free end is pivotally connected to a push pull rod 498, the other end of which is pivotally connected to a crank arm 500 carrying a cam follower 502 riding in a cam track in the side face of a cam disc 504 (see FIG. 6($a$)). This linkage is so arranged that upon rotation of the cam disc 504, the rod 498 is reciprocated to rock the bottom half of the yoke arm 180$b$ thereby imparting angular movement to the shaft 494 and this causes corresponding rocking movement to the top half of the yoke arm 180$b$.

The welding mechanism for the second tie applied around the bundle is shown at 102 and is identical in construction to that hereinbefore described with reference to FIGURES 7 and 9. Raising and lowering of the anvil 300 of the welding mechanism 102 is through a double armed lever 506 fixed on a shaft 508 (see FIGS. 3($a$) and 6($b$)) rotatably mounted in the main frame 4 of the apparatus. A lever 509 is also fixed to said shaft 508 and pivotally coupled to one end of a push pull rod 510, the other end of which is pivotally coupled to a bell crank lever 512 (see FIG. 5($a$)) carried on a shaft 514 mounted to the main frame 4. A cam follower 516 on the bell crank lever 512 engages with a cam track 518 on the periphery of the cam disc 492.

The knife 352$b$ (see FIG. 6($b$)) of the welding mechanism 102 is actuated in like manner hereinbefore described through a slidable bar 366$b$ pivotally connected to one end of a push pull rod 520, the other end of which is pivotally connected to a bell crank lever 522 mounted on an axle 524 carried by the main frame 4. A second push pull rod 526 runs from the bell crank lever 522 to a further bell crank lever 528 (see FIG. 6($a$)) having a cam follower 530 which engages with a cam track 532 on the periphery of the cam disc 504.

Movement of the cylindrical block 104$b$ from its retracted to its extended position in the head 108$b$ of the gripper 64 is as hereinbefore described with reference to FIGURE 8 and rocking of the pedal arm (not shown) to achieve this movement is through the cam faced bar 218$b$ connected to a push pull rod 534 connected to a bell crank lever 536 mounted on axle 538, which is carried by the main frame 4. A push pull rod 540 extends from the bell crank 536 to a second bell crank 542 carrying a cam follower 544 engaging with a cam track 546 around the periphery of the cam disc 504.

The tape clamping shoes of the strainer 62 are coupled via toggle arms and a push-pull rod/bell crank lever linkage to a cam follower riding in a cam track in a side face of the cam disc 504.

The tape arms 82 and 84 are carried in a box frame 548 which encircles, in effect, the bundle path through the machine, and are slidably supported at their forward ends in fixed cross bridge members 549 (see FIG. 6($a$)). The box frame 548 is carried by rollers 550 running in guide channels 552. Two swing arms 551 are connected at their top ends one to either side of the box frame 548, the arms being slotted to receive a pin extending from said frame, and at their bottom ends are fast on a shaft 553 rotatably mounted in the main frame 4. A cam throw arm 555 also is fast on the shaft 553 and has a roller cam follower 557 riding in a cam track in a side face of the cam disc 492.

Because the tape arms 82, 84, lie parallel to the path A of movement of a bundle through the machine, it is not possible to join the intermediate blocks (394) of the two arms by a single cross bar as such would trespass across the bundle path. The arrangement therefore employed is to provide each arm with its own latch 442$b$ (see FIG. 6($a$)) mounted on the box frame 548 which serves the purpose of the cross bar 430 shown in FIGURE 10. Each latch 442$b$ engages with a latch piece 448$b$ mounted on a plate 559 fast on the intermediate block 394 of the respective tape arm 82 or 84. At the end of the forward stroke of the arms 82, 84 the plates 559 come up against the fixed cross bridge members 549 and are arrested thereby in like manner as the cross bar 396 comes up against and is arrested by the abutments 464, whereby the box frame 548 may be closed with the plates 559 and the latches 442$b$ re-engaged with the latch pieces 448$b$.

Simultaneous release of the latches 442$b$ from the latch pieces 448$b$ is obtained by providing each latch with an actuating push rod 561 slidably mounted in the box frame 548. A head 563 of each rod, when the frame 548 is in its rearward position as shown in FIGURE 6($a$), registers with a slide tappet 554 acted upon by a cam arm 556 fast on a shaft 558 (see FIG. 5($a$)) which, through a lever 560, and slider cam follower 567 engaging with a peripheral cam track 569 on the cam disc 492, is turned to cause the cam arms 556 to push the tappets 554 and rods 561 to release the latches 442$b$. Spring means (not shown) are provided to bias the latches 442$b$, tappets 554 and shaft 556 against movement by cam action.

From the foregoing description it will be appreciated that the application of each tie around the bundle is under the control of eight cams, these being formed on two cam discs, each cam disc having a cam track in each side face and two cam tracks around its periphery. The cam tracks in the side faces of the cam discs provide (1) movement for the tape strainer (2) vertical movement of the gripper head (3) horizontal movement of the gripper head and (4) reciprocating movement of the tape arms; the peripheral cams serve (1) to actuate the knife (2) to raise and lower the anvil (3) to replace the latch locking the cross bars of the tape arms and (4) to move the cylindrical block of the gripper head to cause re-engagement of the newly formed free end of tape running from a supply reel. The contouring of the cams depends upon a variety of factors, for example the diameters of the cam discs, the degree of movement and the lengths of the various swing arms and levers, and the design of the required cam profiles is within the knowledge of a person skilled in the art.

The two cam discs 198 and 232 are mounted on a cam shaft 570 and the two cam discs 504 and 492 are mounted on a cam shaft 572, rotation of which cam shafts is by a single electric motor 574. The motor shaft 576 carries double pulleys 578 entrained with belts 580, which also are entrained around double pulleys 582 mounted on a shaft 584. This shaft 584 is rotatable in bearings 586 mounted on the main frame 4. A second pair of double pulleys 588 are fixed to the shaft 584 and entrained with drive belts 590 which are entrained around further double pulleys 592 carried on a drive shaft 594. The shaft 594 is mounted in bearings 596 carried by the main frame 4 of the machine and at one end is coupled to an electro magnetic clutch and brake mechanism 598, the output of which is coupled to the cam shaft 570. Once the machine is in operation the electric motor 574 rotates continuously but a drive is transferred to the cam shaft 570 only when the electromegnetic clutch 598 is engaged.

A bevel gear 600 is fast on the drive shaft 594 and meshes with a second bevel 602 carried by a stub shaft 604 mounted in bearings 606 carried by the main frame 4. An electromagnetic clutch mechanism 608 at its input side is connected to the stub shaft 604 and the output of said mechanism is connected to the cam shaft 572. As with the cam shaft 570 so likewise a drive to the cam shaft 572 is only imparted when the electromagnetic clutch 608 is engaged.

The electrical wiring of the tying machine may be modified to suit the particular requirements, and is within the competency of a person skilled in the art and, therefore, it is not necessary to describe this in detail.

Considering the operation of the tying machine, the sequence of operaton is as follows. Upon switching on the machine the main drive motor 574 is energized and so also is the drive motor 28 for the supply reels of tape. A bundle, upon reaching the appropriate position in the reception and support zone 1 trips a microswitch to de-energize the conveyor which fed the bundle into the zone, if such conveyor were in fact provided. The ram for applying pressure to the bundle during tying is operated, and the bundle also trips a switch to actuate the electromagnetic clutch mechanisms 598 and 608 so that a drive is imparted to the cam shafts 570 and 572 and the cam discs 198, 232, 492 and 504 carried thereby start to rotate. Immediately the latches holding the two cross bars of the two pairs of tape arms 70 and 72, 82 and 84 together are released so that said cross bars move apart, thereby releasing the tape fingers and allowing the two lengths of tape, which have been preprepared each to lie around three sides of the bundle reception and support zone 1 to be pulled back by the tape tensioning mechanisms 40 and 54 into contact with and encircliing at least half the circumference of the bundle. Immediately after the tape fingers have released the tape the gripper heads 48 and 64 descend and at the start of their descents the cylindrical blocks 104 and 104b are rotated through 270° by engagement of the pinions carried by the blocks with the racks 248 at the top of the paths of movement of the gripper heads. When the gripper heads reach the bottoms of their paths of movement, they engage with the yoke arms 180 and 180b which rock to move the sleeves 110 and 110b of the gripper heads inwardly and under the bundle so placing the free ends of the tape which project from the gripper heads correctly into overlapping relation with the reaches of tape running under the bundle and back to the strainers 44 and 62. Next the strainers are operated to pull back on the loops of tape around the bundle so that said loops are made taut and the anvils are now raised so that the overlapping portions of tape are trapped between the anvil heads and the tongues and held snugly therebetween. Heat is next applied, for example by means of the coil 610, so as to weld together the overlapping portions of the tape.

At this stage, a period of dwell is required to permit the formed welds to set and obtain sufficient strength not to pull apart. At the commencement of this dwell, the drive to the cam shafts is discontinued and the brakes actuated to stop rotation of the cam discs. Disengagement of the clutches and operation of the brakes is through a microswitch tripped by upward movement of one or other anvil. At the end of the period of dwell, a time switch re-engages the clutches and disengages the brakes. Thus, the cam discs recommence to rotate. As this occurs the sleeves of the gripper heads are withdrawn and lowered and automatic release of the grip on the tape is obtained by pivoting of the gripper pawls. Once the grip on the tape has been released, the cylindrical blocks of the gripper heads are retracted so that they can move down below the lines of the tape running back from the welds and around the bundle. The cylindrical blocks are brought into proper alignment with the lengths of tape running back from the welds down to the strainers and when in this position they are pushed back to their extended positions and grips are taken on said lengths of tape at locations spaced back from the welds. It is to be noted that as the cylindrical blocks are moved to their extended positions, the gripping pawls are retained in angular disposition away from the gripping surfaces provided on the cylindrical blocks by engagement of the heels of the pawls in the cavities in the noses of the gripper heads.

After the two lengths of tape running back from the welds to the strainers have been gripped, the knives are operated to sever the lengths of tape adjacent the welds. The bundle has now been tied but further operations are necessary to prepare the machine for the next tying operation.

After severing of the tape, the gripper heads move back from underneath the bundle to bring the pinions carried by the cylindrical blocks of said heads into engagement with the racks (246) at the bottom of the paths of movement of said gripper heads. When in these positions the gripper heads are each to a side of the bundle and are now moved up to the top of their paths of movement. At the commencement of this upward movement, the cylindrical blocks are rotated through 90° so that the free ends of tape projecting beyond the gripper heads extend vertically upwardly.

During backward and upward movement of the gripper heads to bring the pinions thereof into engagement with the racks at the bottom of the said paths of movement, the anvils are lowered and the strainers released. While the gripper heads are moving up or after they have reached their topmost positions, the tape arms move to their extended positions, the latches holding the cross bars thereof having first been released so that the tape fingers are swung to their inoperative position parallel to the axes of said arms.

As the arms reach their extended positions, each first cross bar comes up against the fixed abutments (464) so that the two cross bars of each pair of arms are brought together, swinging the tape fingers to engage behind the lengths of tape now lying under tension vertically along the paths of movement of the gripper heads. With the tape thus engaged by the fingers, the tape arms are retracted so pulling two lengths of tape each to lie around three sides of the bundle reception and support zone 1. When the tape arms reach their withdrawn positions a microswitch is tripped to deenergise the clutches and energise the brakes so that the drives to the cam shafts are disconnected and rotation of the cams is stopped.

The machine is now prepared for the next bundle tying cycle.

Although the two operations are performed at the same time it is to be noted that one occurs slightly in advance of the other; this is necessary because one length of tape lies within the other and to avoid conflict of the arms 70 and 72 with the arms 82 and 84.

During the tying cycle first described each gripper head 48 and 64 operates as follows. Considering the gripper head 48, at the commencement of the cycle the head is at the top of its path of movement B with the detent lever 164 depressed by engagement with the abutment 252 so that the sleeve 110 is released to slide forward under influence of the biasing springs 183 between said sleeve and the carriage 154 until the detent 170 engages in the aperture 172. The sleeve 110 is thus locked in its intermediate position and in this position the latch release finger 142 is in engagement with the fixed abutment 242 so that the latch nose 132 is withdrawn from the flat 135 in the cylindrical block 104. Accidental rotation of the cylindrical block, however, is prevented because the pinion 244, when the sleeve 110 is in this intermediate position, is in engagement with the rack 248. When, through rotation of the cam disc 232 the swing arm 266 is rocked downwardly to pull down the elongated slider block 260 so that the gripper head 48 moves down, through the rack 248 and pinion 244, the cylindrical block 104 is rotated through 270° and thereupon is locked in this position by engagement of the latch nose 132 in the recess 134 in said block, movement of the latch 130 being under the bias of the spring 136. It will be appreciated that the latch is free to make this movement because as the head 48 moves down, the latch release finger 142 moves out of engagement with the abutment 242. With the cylindrical block 104 in this present position, the free ends of the tape projecting therefrom and held by the gripping pawl 116 against the surface 114, projects horizontally towards the side of the bundle being tied.

As the gripper head reaches the bottom of its path of movement and into the position shown in FIGURE 4 the pin 184 at the tail of the sleeve 110 is received in the forked end 182 of the yoke arm 180 and the detent lever 174 comes up against the fixed abutment 250 and is rocked thereby to pull the detent 170 out of engagement in the aperture 172. The sleeve 110, however, is now held against sliding further forward under the bias of the spring 183 by the yoke arm 180. In this particular position of the gripper head 48, the latch release finger 144 is above and not in contact with the fixed abutment 240.

While the gripper head 48 is at this present level, the yoke arm 180 is rocked through rotation of the cam disc 232 to move the sleeve 110 forward underneath the bundle and to bring the free end of the tape projecting beyond the nose 108 of said head into register above the anvil 300. The gripper head now remains stationary in this position for a short time while the welding or heat sealing operation is performed and when it has been completed but before the knife 352 is actuated, the sleeve 110 is withdrawn by appropriate rocking of the yoke arm 180. Simultaneously as this occurs, the gripper head 48 as a whole is lowered a small amount and as this double movement occurs, the grip on the tape is automatically released because the backward and downward movement causes the tape to apply a load on the gripping pawl 116 such that it is rotated in the direction of the arrow D, thereby bringing the heel 124 into register with the cavity 126. As soon as this occurs the cylindrical block 104 automatically is retracted into the cylindrical bore 106 of the nose 108 by the bias of the compression coil spring 200.

The aforesaid backward and downward movement of the gripper head brings the nose 108 thereof into correct register with the reach of tape extending back from the newly formed weld held at the anvil, to the guide roller 45 and strainer 44. By correct register is meant that the line of said reach of tape is inclined across the side of the nose 108 below the level of the surface 114 but above the level of the angularly displaced gripping pawl 116. A new grip is taken on the said reach of tape by rocking of the pedal lever 208 through displacement of the bar 218 under influence of the cam on the peripheral surface of the cam disc 232. As hereinbefore described, rocking of the pedal arm 208 pushes on the end of the shaft 118, thereby forcing the cylindrical block 104 against the bias of the compression coil spring 200 but until such time as said cylindrical block is fully home the gripping pawl 116 stays in this position of angular displacement. Thus the projection 112 is located above, and the displaced gripping pawl is located below the reach of tape. With the cylindrical block 104 in this fully extended position, the gripper pawl 116 under the bias of the coil spring 120, snaps back into the position shown in FIGURE 7 trapping the tape between its nose and the surface 114. As soon as this has occurred, the knife 352 is actuated to sever the tape adjacent the weld and so create a new free end of tape projecting horizontally under the bundle beyond the nose 108 of the gripper head.

Next the yoke arm 180 is rocked to withdraw the sleeve 110 from under the bundle and to bring the release finger 144 against the abutment 240, thus releasing the latch 130 from engagement in the recess 134 in the cylindrical block 104. Not only does the finger 144 engage with the abutment 240 but also the pinion 244 on the cylindrical block 104 engages with the rack 246 and the detent 160 drops into the aperture 162 so re-locking the sleeve 110 in the carriage 154. It will be appreciated that to bring the detent 160 into engagement with the aperture 162, the aperture 172 must be moved pass the detent 170 but this detent is not free to drop into the said aperture because the detent lever 174 is still in engagement with the abutment 250.

Finally the gripper head 48 is raised back up to its uppermost position. As it starts the upward movement the block is turned through 90° and the latch automatically engages in the flat 135, and as the head comes into its uppermost position, the detent lever 164 moves into engagement with the abutment 252 so releasing the detent 160 from the aperture 162 and allowing the sleeve 110 to slide forward until the detent 170 engages in the aperture 172. The gripper head is thus re-positioned in its original starting position.

The machine hereinbefore described applies two ties around a single bundle which may be a stack of newspapers or other compressible stack of sheet material. The ram plate 7 coupled to the hydraulic or pneumatic cylinder and piston 5 is, therefore, provided to apply pressure to the stack. During the tying cycle, the ram is operated immediately after the bundle has been placed in position in the reception and support zone 1 and pressure is maintained until tying has been completed. Thus, the loops of tape applied around the bundle are not subjected to excessive load until the ends of each loop have been welded together.

The application of heat to make a weld has not been described in detail because any known suitable mechanism may be used. Preferably, however, a high frequency welding device, indicated diagrammatically by the heating coil 610 shown in FIG. 9, is incorporated in the head of the anvil. Not only may the weld be made by the application of heat but also by subjecting the contiguous surfaces to be welded to ultra sonic vibration, i.e. by an ultra sonic welding technique.

Although the machine as described applies two ties around a single bundle, it is possible since the drive of each set of mechanisms, comprising tape arms, gripper head, anvil and heat sealing mechanism, and strainer which applies a single tie, is through an electromagnetic clutch and brake mechanism to disengage the drive to one or other of the tying mechanism so that the machine is used to apply only a single tie to a single bundle. Furthermore, a machine may be constructed which is capable of applying only one tie, in which case, it would be provided with a tying mechanism similar to that hereinbefore described including the tape arms 70 and 72, i.e. the mechanism which includes tape arms 82 and 84, and which in certain regards is more complicated because it has to straddle the bundle being tied, would not be employed.

What I claim is:

1. A bundle tying machine including a bundle reception and support zone, means to draw a length of tying tape from a supply and to position it around at least half of the circumference of said zone preparatory to the reception of a bundle therein, said positioning means being adapted to disengage from the tape after a bundle has been positioned in said zone whereby the tape lies around at least half of the circumference of the bundle, a gripper device adapted to grip a leading free end of the tape and movable to draw said free end across the remaining side or sides of the bundle in the zone, whereby the bundle is encircled by a loop of tape, means to secure the free end of the tape to the portion thereof leading from said loop back to the supply, and means to sever the secured loop from said portion.

2. A bundle tying machine according to claim 1 including additional means adapted to draw a second length of tying tape from a second supply and to position it around at least half of the circumference of the said zone, the two lengths of tape when positioned as aforesaid lying in planes at right angles to each other.

3. A bundle tying machine according to claim 1 including means adapted to draw the length of tape from the supply and to position it around three sides of the bundle reception and support zone.

4. A bundle tying machine according to claim 3 wherein the tape positioning means comprises a pair of draw-in arms adapted to pull the tape across the bundle reception and support zone while the free end of said tape is held stationary.

5. A bundle tying machine according to claim 4 wherein said arms are mounted for straight line reciprocating movement across a pair of opposite sides of the zone.

6. A bundle tying machine according to claim 4 including a tape engagement finger pivoted to each draw arm, and means to displace said finger between an inoperative position lying parallel to the longitudinal axis of the draw arm and an operative position normal to said arm.

7. A bundle tying machine according to claim 6 wherein each draw arm comprises an outer sleeve, to one end of which the tape engaging finger is pivotally mounted and an actuating rod slidably contained in said sleeve and coupled to the finger, whereby upon relative displacement between the sleeve and the rod, the finger is swung between its operative and its inoperative positions.

8. A bundle tying machine according to claim 7 wherein the outer sleeve and the actuating rod of the pair of draw arms are connected by cross bars for simultaneous displacement.

9. A bundle tying machine according to claim 8 including means biasing the sleeve and rod to a position of displacement in which the tape fingers are in their inoperative positions and latch means to hold the sleeve and rod against such displacement.

10. A bundle tying machine according to claim 9 including a latch arm pivotally mounted on one cross bar and a latch piece, engageable by said latch arm, mounted on the other cross bar.

11. A bundle tying machine according to claim 3 including a tape gripper head reciprocably movable across the fourth side of the bundle reception and support zone.

12. A bundle tying machine according to claim 11 wherein the tape gripper head includes a tape gripping mechanism rotatably mounted therein and adapted to be rotated through one revolution during reciprocating movement of the gripper head in a bundle tying cycle.

13. A bundle tying machine according to claim 12 wherein the tape gripping mechanism comprises a cylindrical block housed in a cylindrical bore in a nose of a sleeve longitudinally slidable in a carrier, a gripping pawl rotatably mounted on an end face of said block and a projection from said end face providing a gripping surface against which the tape is adapted to be trapped and held by the gripping pawl.

14. A bundle tying machine according to claim 13 including releasable means to lock the cylindrical block in a first position of angular displacement in which the free end of tape projects horizontally and a second position of angular displacement in which said free end projects vertically.

15. A bundle tying machine according to claim 14 including releasable means adapted to lock the sleeve against longitudinal sliding movement.

16. A bundle tying machine according to claim 1 including a strainer adapted to apply a pull on the loop of tape applied around the bundle, prior to securing the free end of the tape, thereby to pull the tape taut.

17. A bundle tying machine according to claim 16 wherein the strainer comprises a pair of opposed gripper shoes slidable in a guide rack having a pair of inclined opposite cam faces, whereby as the shoes are moved across the faces they are pressed together.

18. A bundle tying machine according to claim 1 including means to weld or heat seal the free end of the tape to a portion thereof leading from the loop back to the supply.

19. A bundle tying machine according to claim 18 including an anvil, a back-up plate therefor, said anvil and back-up plate being movable between operative positions and inoperative positions and means to supply heat to the overlapped areas of tape trapped between said anvil and back-up plate when they are in their operative positions.

20. A bundle tying machine according to claim 18 including a knife movable to sever the tape leading back from the weld to the supply.

21. A bundle tying machine according to claim 1 including drive means comprising a single electric motor coupled through at least one electromagnetic clutch and brake mechanism to at least one cam shaft, a plurality of cam discs mounted on said cam shafts and each providing at least one cam track and linkage connecting the cam tracks to the various operating mechanisms of the machine.

22. A bundle tying machine according to claim 1 including a pneumatic or hydraulic ram connected to a pressure plate adapted to apply a compression load to a bundle during the tying thereof.

References Cited by the Examiner

UNITED STATES PATENTS

| 397,457 | 2/1889 | Crain | 100—17 |
| 2,420,498 | 5/1947 | Pojman | 100—8 X |
| 2,982,063 | 5/1961 | Coleman et al. | 53—3 |
| 3,080,811 | 3/1963 | Freudling et al. | 100—2 |

FOREIGN PATENTS

| 176,634 | 9/1961 | Sweden. |

IRVING BUNEVICH, *Primary Examiner.*

LOUIS O. MAASSEL, *Examiner.*